United States Patent Office 3,781,330
Patented Dec. 25, 1973

1

3,781,330
ORTHOAMINOPHENYL-N-METHYLCARBAMATES
Erwin Nikles, Liestal, Switzerland, assignor to
Ciba-Geigy AG, Basel, Switzerland
No Drawing. Filed Oct. 26, 1970, Ser. No. 84,215
Claims priority, application Switzerland, Oct. 31, 1969,
16,282
Int. Cl. C07c 125/06
U.S. Cl. 260—479 C    4 Claims

ABSTRACT OF THE DISCLOSURE

N-monosubstituted o-aminophenylcarbamates are effective against pests, in particular against insects, nematodes and representatives of the order Acarina. They may be used in the form of pesticidal preparations.

---

This invention relates to new carbamates, their manufacture and their use as pesticides.

The present invention provides compounds of the formula

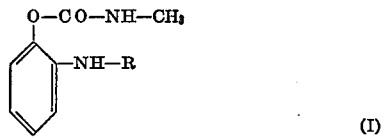

(I)

in which R represents an alkyl, alkoxyalkyl, alkenyl or alkynyl radical having from 3 to 5 carbon atoms, and the acid addition salts thereof with inorganic or organic acids.

Special interest attaches to those compounds in which R represents a branched alkyl, alkoxyalkyl, alkenyl or alkynyl radical having from 3 to 5 carbon atoms, and to their corresponding acid addition salts.

Possible groups R are, for example, n-propyl, isopropyl, n-butyl, sec.butyl, tert.butyl, the amyl isomers, $\beta$-methoxyisopropyl, allyl, methallyl, crotyl, propargyl, 1-butyn-3-yl, 3-methyl-1-buten-3-yl and 3-methyl-1-butyn-3-yl.

The carbamates of the Formula I and their acid addition salts possess valuable biocidal properties. They are, in particular, active against all stages of development of sucking, biting and stinging insects, nematodes and representatives of the order Acarina (mites, ticks and spider mites).

Belgian patent specification No. 606,296 has already proposed the compound of the formula

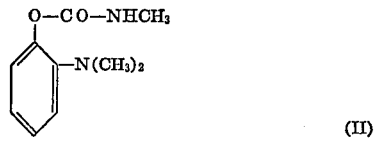

(II)

for combating insects, above all aphids.

Belgian patent specification No. 719,776 has proposed compounds of formula

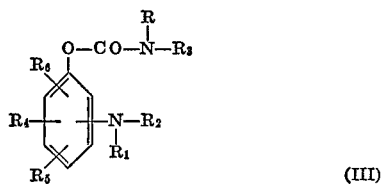

(III)

and their salts especially for combating insects and pests of the order Acarina. Herein, $R_1$ represents an alkynyl radical having from 3 to 6 carbon atoms, $R_2$ represents a lower alkyl, alkenyl or alkynyl radical, and R, $R_3$, $R_4$, $R_5$ and $R_6$ which can be identical or different, are hydrogen or lower alkyl radicals, especially methyl radicals.

It has now been found that the carbamates of the Formula I develop a superior action in combating insects, Acarina and nematodes as compared to the compounds of the Formula II or III.

Using the compounds of Formula I it is possible to combat harmful insects, especially those of the orders Corrodentia, Orthoptera, Coleoptera, Thysanoptera, Hymenoptera, Rhynchota, Diptera, Lepidoptera, as well as pests of the order Acarina.

Numerous particularly harmful varieties of insects or varieties of Acarina are known. Amongst the sucking insects there may for example be mentioned: aphids (Aphidae), for example *Myzus persicae, Doralis fabae, Rhopalosiphum padi, Macrosiphum pisi, Macrosiphum solanifolii, Cryptomyzus korschelti, Sappaphis mali, Hyalopterus arundinis, Myzus cerasi* and also scale insects and mealybugs (Coccina) for example *Aspidiotus hederae, Lecanium hesperidum, Pseudococcus maritimus*, varieties of thrips (Thysanoptera), for example *Hercinothrips femoralis*, bugs, for example *Piesma quadrata, Rhodnius prolixus, Dysdercus intermedius, Triatoma infestans* or *Cimex lectularius*, and Cicadas, for example *Eusecelis bilobatus* or *Nephotettix bipunctatus*.

Amongst the biting insects there may for example be mentioned: Lepidoptera such as *Plutella maculipennis, Lymantria dispar, Euproctis chrysorrhoea, Malocosoma neustria, Mamestra brassicae, Agrotis segetum, Pieris brassicae, Cheminatobia brumata, Tortrix viridana, Prodenia litura, Hyponomenta padella, Ephestia kuhniella* and *Galleria mellonella*, and also storage pests such as *Dermestes frischii, Trogoderma granarius, Tribolium castaneum, Sitophilus granarius* and *S. zea mais, Stegobium paniceum, Tenebrio molitor, Oryzaephilus surinamensis*, Agriotes sp., *Blatella germanica, Periplaneta americana, Blatta orientalis, Blaberus gigantus, Blaberus fuscus* and *Acheta domesticus*.

The Diptera mainly comprise the flies (*Drosophila melanogaster, Ceratitis capitata, Musca domestica, Lucilia sericata* and *Calliphora erythrocephala*) and the mosquitos (*Aedes aegypti, Culex pipiens* and Anopheles).

Amongst the representatives of the order Acarina spider mites are to be highlighted as important pests, for example *Tetranychus telarius, T. althaeae, T. urticae, Paratetranychus pilosus* and *Panonychus ulmi*, blister mites such as *Eriophyes ribis*, and Tarsonemides, for example *Hemitarsonemus latus* and *Tarsonemus pallidus*. Further, ectoparasites should also be mentioned, for example ticks and mites such as *Boophilus microplus, Dermanyssus gallinae, Ornithonyssus bacoti, Orinthonyssus sylviarum, Rhipicephalus bursa, Pneumonyssus caninum, Laelaps nutalli, Acarapis woodi* and *Psorergates ovis*.

Further, the following genera, which are destroyed by compounds of Formula I, should be mentioned amongst the nematodes: Heterodera such as *H. rostochiensis* and *H. schachtii*, Meloidogyne such as *M. arenaria* and *M. incognita*, Aphelenchus such as *A. ritzemabosi, A. fragariae* and *A. oryzae*, Aphelenchoides, Ditylenchus such as *D. dipsaci*, Paratylenchus, Rotylenchus, Xiphinema, Rhadopholus, Tylenchulus, Circonemoides, Longidorus, and Trichodorus.

The compounds according to the present invention can be used by themselves or together with customary pesticidal compounds, especially insecticides, acaricides, nematocides, bactericides, and fungicides.

The present invention also provdies a pesticidal preparation which comprises as the active ingredient, at least one carbamate of the formula

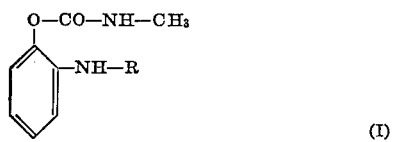

(I)

in which R represents an alkyl, alkoxyalkyl, alkenyl or alkynyl radical having from 3 to 5 carbon atoms, or an acid addition salt thereof, together with a suitable carrier and/or further additive and/or further pesticidal compound.

By carriers there are above all understood extenders (solvents or solid or liquid diluents). Additives are intended to encompass other substances customary in formulation technology, for example, natural or regenerated mineral substances, suspending agents, emulsifiers, wetting agents, adhesives, thickeners and binders, and also, for example, baits for insects, or fertilizers, if for example an improvement of the soil conditions and growth conditions is desired simultaneously with combating of pests.

Pesticidal compounds which can be added to broaden the spectrum or as a desirable supplement, say in treating a plant culture, can for example be taken from the class of the organic phosphorus compounds, the carbamates, the ureas, the saturated and unsaturated halogen-fatty acids, the triazines, the nitroalkylphenols, the quaternary ammonium salts, the sulphamic acids, and the arsenic compounds, borates or chlorates.

The following compounds can, for example, be used as insecticidal, acaricidal and/or nematocidal combination partners:

PHOSPHORIC ACID DERIVATIVES

Bis-O,O-diethylphosphoric acid anhydride (TEPP)
O,O,O,O-tetrapropyldithiopyrophosphate
Dimethyl(2,2,2-trichloro-hydroxyethyl)phosphonate (Trichlorfon)
1,2-dibromo-2,2-dichloroethyldimethylphosphate (Naled)
2,2-dichlorovinyldimethylphosphate (Dichlorfos)
2-methoxycarbamyl-1-methylvinyldimethylphosphate (Mevinphos)
Dimethyl-1-methyl-2-(methylcarbamoyl)vinylphosphate cis (Monocrotophos)
3-(dimethoxyphosphinyloxy)-N-methyl-N-methoxy-cis-crotonamide
3-(dimethoxyphosphinyloxy)-N,N-dimethyl-cis-crotonamide (Dicrotophos)
2-chloro-2-diethylcarbamoyl-1-methylvinyldimethyl-phosphate (Phosphamidon)
O,O-diethyl-O(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-[(ethylthio)ethyl]dithiophosphate (Disulfoton)
O,O-dimethyl-S-2-(ethylsulphinyl)ethylthiophosphate (Oxydemetonmethyl)
O,O-dimethyl-S-(1,2-dicarbethoxyethyl)dithiophosphate (Malathion)
(O,O,O,O-tetraethyl-S,S'-methylene-bis-[dithiophosphate] (Ethion)
O-ethyl-S,S-dipropyldithiophosphate
O,O-dimethyl-S-(N-methyl-N-formylcarbamoylmethyl)-dithiophosphate (Formotion)
O,O-dimethyl-S-(N-methylcarbamoylmethyl)dithiophosphate (Dimethat)
O,O-dimethyl-S-(N-ethylcarbamoylmethyl)dithiophosphate (Ethoatmethyl)
O,O-diethyl-S-(N-isopropylcarbamoylmethyl)-dithiophosphate (Prothoat)
S-N-(1-cyano-1-methylethyl)carbamoylmethyldiethyl-thiolphosphate (Cyanthoat)
S-(2-acetamidoethyl)-O,O-dimethyldithiophosphate
Hexamethylphosphoric acid triamide (Hempa)
O,O-dimethyl-O-p-nitrophenylthiophosphate (Parathion-methyl)
O,O-diethyl-O-p-nitrophenylthiophosphate (Parathion)
O-ethyl-O-p-nitrophenylphenylthiophosphonate (EPN)
O,O-dimethyl-O-(4-nitro-m-tolyl)thiophosphate (Fenitrothion)
O,O-dimethyl-O-(2-chloro-4-nitrophenyl)thiophosphate Dicapthon)
O,O-dimethyl-O-p-cyanophenylthiophosphate (Cyanox)
O-ethyl-O-p-cyanophenylphenylthiophosphonate
O,O-diethyl-A-2,4-dichlorophenylthiophosphate (Dichrofenthion)
O-2,4-dichlorophenyl-O-methylisopropylamidothiophosphate
O,O-dimethyl-O-2,4,5-trichlorophenylthiophosphate (Ronnel)
O-ethyl-O-2,4,5-trichlorophenylethylthiophosphonate (Trichloronat)
O,O-dimethyl-O-2,5-dichloro-4-bromophenylthiophosphate (Bromophos)
O,O-diethyl-O-2,5-dichloro-4-bromophenylthiophosphate (Bromophos-ethyl)
O,O-dimethyl-O-(2,5-dichloro-4-iodophenyl)-thiophosphate (iodofenphos)
4-tert.butyl-2-chlorophenyl-N-methyl-O-methyl-amidophosphate (Crufomat)
Dimethyl-p-(methylthio)phenylphosphate
O,O-dimethyl-O-(3-methyl-4-methylmercaptophenyl) thiophosphate (Fenthion)
Isopropylamino-O-ethyl-O-(4-methylmercapto-3-methylphenyl)-phosphate
O,O-diethyl-O-p-[(methylsulphinyl)phenyl]-thiophosphate (Fensulfothion)
O,O-dimethyl-O-p-sulphamidophenylthiophosphate
O-[p-(dimethylsulphamido)phenyl]O,O-dimethylthiophosphate (Famphur)
O,O,O',O'-tetramethyl-O,O'-thiodi-p-phenylenethiophosphate
O-(p,(p-chlorophenylazophenyl)O,O-dimethylthiophosphate (Azothoat)
O-ethyl-S-phenyl-ethyldithiophosphonate
O-ethyl-S-4-chlorophenyl-ethyldithiophosphonate
O-isobutyl-S-p-chlorophenyl-ethyldithiophosphonate
O,O-dimethyl-S-p-chlorophenylthiophosphate
O,O-dimethyl-S-(p-chlorophenylthiomethyl)-dithiophosphate
O,O-diethyl-p-chlorophenylmercaptomethyl-dithiophosphate (Carbophenothion)
O,O-diethyl-S-p-chlorophenylthiomethyl-thiophosphate
O,O-dimethyl-S-(carbethoxy-phenylmethyl)dithiophosphate (Phenothoat)
O,O-diethyl-S-(carbofluoroethoxy-phenylmethyl)-dithiophosphate
O,O-dimethyl-S-(carbisopropoxy-phenylmethyl)-dithiophosphate
O,O-dimethyl-O-(alpha-methylbenzyl-3-hydroxy-crotonyl)phosphate
2-chloro-1-(2,4-dichlorophenyl)vinyl-diethylphosphate (Chlorfenvinphos)
2-chloro-1-(2,4,5-trichlorophenyl)vinyl-dimethyl-phosphate O-(2-chloro-1-(2,5-dichlorophenyl)vinyl-O,O-diethyl-
  thiophosphate
Phenylglyoxylonitriloxime-O,O-diethylthiophosphate
  (Phoxim)
O,O-diethyl-O-(3-chloro-4-methyl-2-oxo-2-H-1-benzo-
  pyran-7-yl)-thiophosphate (Coumaphos)
O,O-diethyl-7-hydroxy-3,4-tetramethylene-coumarinyl-
  thiophosphate (Coumithoat)
2,3-p-dioxanedithiol-S,S-bis(O,O-diethyldithiophos-
  phate) (Dioxathion)
2-methoxy-4-H-1,3,2-benzodioxaphosphorine-2-sulphide
O,O-diethyl-O-(5-phenyl-3-isooxyzolyl (sic)) thio-
  phosphate
S-[(6-chlor-2-oxo-3-benzoxazolinyl)methyl]O,O-di-
  ethyldithiophosphate (Phosalon)
2-(diethoxyphosphinylimino)-4-methyl-2,3-dithiolane
O,O-dimethyl-S-[2-methoxy-1,3,4-thiadiazol-5-(4H)-
  onyl-(4)-methyl]dithiophosphate
Tris-(2-methyl-1-aziridinyl)-phosphine-oxide (Metepa)
O,O-dimethyl-S-phthalimidomethyl-dithiophosphate
S-(2-chloro-1-phthalimidoethyl)-O,O-diethyldithio-
  phosphate
N-hydroxynaphthalimido-diethylphosphate
Dimethyl-3,5,6-trichloro-2-pyridylphosphate
O,O-dimethyl-O-(3,5,6-trichloro-2-pyridyl)thiophos-
  phate
O,O-diethyl-O-(3,5,6-trichloro-2-pyridyl)thiophosphate
O,O-diethyl-O-2-pyrazinylthiophosphate (Thionazin)
O,O-diethyl-O-(2-isopropyl-4-methyl-6-pyrimidyl)thio-
  phosphate (Diazinon)
O,O-diethyl-O-(2-quinoxylyl)thiophosphate
O,O-dimethyl-S-(4-oxo-1,2,3-benzotriazin-3(4H)-
  ylmethyl)dithiophosphate (Azinphosmethyl)
O,O-diethyl-S-(4-oxo-1,2,3-benzotriazin-3(4H)-
  ylmethyl)dithiophosphate (Azinphosethyl)
S-[(4,6-diamino-S-triazin-2-yl)methyl]-O,O-dimethyl-
  dithiophosphate (Menazon)
S-[2-(ethylsulphonyl)ethyl]dimethylthiolphosphate
  (Dioxydemeton-S-methyl)
Diethyl-S-[2-(ethylsulphinyl)ethyl]dithiophosphate
  (Oxydisulfoton)
Bis-O,O-diethylthiophosphoric acid anhydride (sulfotep)
Dimethyl-1,3-di(carbomethoxy)-1-propen-2-yl-phosphate
Dimethyl-(2,2,2-trichloro-1-butyroyloxyethyl)phos-
  phonate (Butonat)
O,O-dimethyl-O-(2,2-dichloro-1-methoxy-vinyl)phos-
  phate
O,O-dimethyl-O-(3-chloro-4-nitrophenyl)thiophosphate
  (Chlorthion)
O,O-dimethyl-O (or S)-2-(ethylthioethyl)thiophosphate
  (Demeton-S-methyl)
Bis-(dimethylamido)fluorophosphate (Dimefox)
2-(O,O-dimethyl-phosphoryl-thiomethyl)-5-methoxy-
  pyrone-4
3,4-dichlorobenzyl-triphenylphosphonium chloride
Dimethyl-N-methoxymethylcarbamoylmethyl-dithio-
  phosphate (Formocarbam)
O,O-diethyl-O-(2,2-dichloro-1-chlorethoxyvinyl)phos-
  phate
O,O-dimethyl-O-(2,2-dichloro-1-chlorethoxyvinyl)phos-
  phate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithio-
  phosphate (Methylcarbophenothion)
O,O-dimethyl-S-(ethylthiomethyl)dithiophosphate
Diisopropylaminofluorophosphate (Mipafox)
O,O-dimethyl-S-(morpholinylcarbamoylmethyl)dithio-
  phosphate (Morphothion)
Bismethylamido-phenylphosphate
O,O-dimethyl-S-(benzenesulphonyl)dithiophosphate
O,O-dimethyl-(S and O)-ethylsulphinylethylthio-
  phosphate
O,O-diethyl-O-4-nitrophenylphosphate
O,O-diethyl-S-(2,5-dichlorophenylthiomethyl)dithio-
  phosphate (Phendapton)
Triethoxy-isopropoxy-bis(thiophosphinyl)disulphide
O,O-diethyl-O-(4-methyl-coumarinyl-7)-thiophosphate
  (Potasan)
2-methoxy-4H-1,3,2-benzodioxaphosphorine-2-oxide
Octamethylpyrophosphoramide (Schradan)
Bis(dimethoxythiophosphinylsulphido)-phenylmethane
5-amino-bis(dimethylamido)phosphinyl-3-phenyl-1,2,4-
  triazole (Triamiphos)
N-methyl-5-(O,O-dimethylthiolphosphoryl)-3-thiavaler-
  amide (Vamidothion) and
N,N,N',N'-tetramethyldiamidofluorophosphate
  (Dimefox)

CARBAMIC ACID DERIVATIVES 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate (Amino-
  carb)
4-methylthio-3,5-xylyl-N-methylcarbamate (Methiocarb)
3,4,5-trimethylphenyl-N-methylcarbamate
2-chlorophenyl-N-methylcarbamate (CPMC)
5-chloro-6-oxo-2-norbornane-carbonitrile-O-(methyl-
  carbamoyl)-oxime
1-(dimethylcarbamoyl)-5-methyl-3-pyrazolyl-N,N-
  dimethylcarbamate (Dimetilan)
2,3-dihydro-2,2-dimethyl-7-benzofuranyl-N-methyl-
  carbamate (Carbofuran)
2-methyl-2-methylthio-propionaldehyde-O-(methyl-
  carbamoyl)oxime (Aldicarb)
8-quinaldyl-N-methylcarbamate and its salts
Methyl 2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-tert.butylphenyl-N-methylcarbamate
3-sec.-butylphenyl-N-methylcarbamate
3-isopropyl-5-methylphenyl-N-methylcarbamate
  (Promecarb)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-methylcarbamate
  (Dioxycarb)
2-(4,5-dimethyl-1,3-dioxolan-2-yl)phenyl-N-methylcar-
  bamate
2-(1,3-dioxan-2-yl)phenyl-N-methylcarbamate
2-(1,3-dithiolan-2-yl)phenyl-N-methylcarbamate
2-(1,3-dithiolan-2-yl)phenyl-N,N-dimethylcarbamate
2-isopropoxyphenyl-N-methylcarbamate (Arprocarb)
2-(2-propinyloxy)phenyl-N-methylcarbamate
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate
  (Allyxicarb)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate
1-isopropyl-3-methylpyrazol-5-yl-N,N-dimethylcarbamate
  (Isolan)
2-(N',N'-dimethylcarbamoyl)-3-methylpyrazol-5-yl-
  N,N-dimethylcarbamate
2-dimethylamino-5,6-dimethylpyrimidin-4-yl-N,N-
  dimethylcarbamate 3-methyl-4-dimethylaminomethyleneiminophenyl-N-methylcarbamate
3-dimethylamino-methyleneiminophenyl-N-methylcarbamate
1-methylthio-ethylimino-N-methylcarbamate (Methoxymyl)
2-methylcarbamoyloxyimino-1,3-dithiolane
5-methyl-2-methylcarbamoyloxyimino-1,3-oxathiolane
2-(1-methoxy-2-propoxy)phenyl-N-methylcarbamate
2-(1-butin-3-yl-oxy)phenyl-N-methylcarbamate
3-methyl-4-(dimethylamino-methylmercapto-methyleneimino)phenyl-N-methylcarbamate
1,3-bis(carbamoylthio)-2-(N,N-dimethylamino)-propane hydrochloride
5,5-dimethylhydroresorcinoldimethylcarbamate
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methylcarbamate
2-[allyl-isopropylamino]-phenyl-N-methylcarbamate and
3-[allyl-isopropylamino]-phenyl-N-methylcarbamate.

CHLORINATED HYDROCARBONS

γ-Hexachlorocyclohexane [Gammexane; Lindane; γ HCH]
1,2,4,5,6,7,8,8-octachloro-3α,4,7,7α'-tetrahydro-4,7-methyleneindane [Chlordan]
1,4,5,6,7,8,8-heptachloro-3α,4,7,7α-tetrahydro-4,7-methyleneindane [Heptachlor]
1,2,3,4,10,10-hexachloro-1,4,4α,5,8,8α-hexahydro-endo-1,4-exo-5,8-dimethanonaphthalene [Aldrin]
1,2,3,4,10,10-hexachloro-6,7-epoxy-1,4,4α,5,6,7,8,8α,9-octahydro-exo-1,4-endo-5,8-dimethanonaphthalene [Dieldrin] Endrin
6,7,8,9,10,10-hexachloro-1,5,5α,6,9,9α-hexahydro-6,9-methano-2,3,4 benzo[e]-dioxa-thiepene-3-oxide [Endosulfan]
Chlorinated camphor [Toxaphen]
Decachlorooctahydro-1,3,4-metheno-2H-cyclobuta[ed]pentalen-2-one
Dodecachlorooctahydro-1,3,4-metheno-1H-cyclobuta[cd]pentalene [Mirex]
Ethyl-1',1α,3,3α,4,5,5α,5α,6-decachlorooctahydro-2-hydroxy-1,3,4-metheno-1H-cyclobuta[cd]pentalene-2-laevulinate
Bis(pentachloro-2,4-cyclopentadiene-1-yl)
Dinoctone-o
1,1,1-trichloro-2,2-bis(p-chlorophenyl)ethane [DDT]
Dichlorodiphenyl-dichlorethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-trichloro-2,2 bis(p-methoxyphenyl)ethane [Methoxychlor]
Diethyl-diphenyl-dichlorethane
Decachloropentacyclo(3,3,2,0$^{2,6}$,0$^{3,9}$,0$^{7,10}$)decan-4-one [Chlordecon].

NITROPHENOLS AND DERIVATIVES 4,6-dinitro-6-methylphenol Na salt [Dinitrocresol]
Dinitrobutylphenol-2,2',2''-triethanolamine salt
2-cyclohexyl-4,6-dinitrophenol [Dinex]
2-(1-methylheptyl)-4,6-dinitrophenyl-crotonate [Dinocap]
2 sec.-butyl-4,6-dinitrophenyl-3-methyl-butenoate [Binapacryl]
2 sec.-butyl-4,6-dinitrophenyl-cyclopropionate and
2 sec.-butyl-4,6-dinitrophenyl-isopropyl-carbonate [Dinobuton]

VARIOUS SUBSTANCES

Sabadilla
Rotenone
Cevadine
Veratridine
Ryania
Pyrethrin 3-allyl-2-methyl-4-oxo-2-cyclopenten-1-yl-chrysanthemumate (Allethrn)
6-chloropiperonyl-chrysanthemumate (Barthrin)
2,4-dimethylbenzyl-chrysanthemumate (Dimethrin)
2,3,4,5-tetrahydrophthalimidomethyl-chrysanthemumate
(5-benzyl-3-furyl)-methyl-2,2-dimethyl-3-(2-methylpropanyl)cyclopropanecarboxylate
Nicotine
*Bacillus thuringiensis* Berliner
Dicyclohexylcarbodiimide
Diphenyldiimide [azobenzene (sic)]
4-chlorobenzyl-4-chlorophenylsulphide [Chlorbensid]
Creosote oil
6-methyl-2-oxo-1,3-dithiolo-[4,5-b]-quinoxaline [Quinomethionat]
(I)-3-(2-furfuryl)-2-methyl-4-oxocyclopent-2-enyl(I)-(cis+trans)chrysanthemum-monocarboxylate [Furethrin]
2-pivaloyl-indane-1,3-dione [Pindon]
2-fluorethyl(4-bisphenyl)acetate
2-fluoro-N-methyl-N(1-naphthyl)-acetamide
Penthachlorophenol and salts
2,2,2-trichloro-N-(pentachlorophenyl)-acetimidoyl chloride
N'-(4-chloro-2-methylphenyl)-N,N-dimethylformamidine (Chlorphenamidine)
4-chlorobenzyl-4-fluorophenyl-sulphide (Fluorobenside)
5,6-dichloro-1-phenoxycarbanyl-2-trifluoromethylbenzimidazole (Fenozaflor)
Tricyclohexyl-stannic hydroxide
2-thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-dichlorophenyl-benzenesulphonate
p-chlorophenyl-benzenesulphonate (Fenson)
p-chlorophenyl-2,4,5-trichlorophenylsulphone (Tetradifon)
p-chlorophenyl-2,4,5-trichlorophenylsulphide (Tetrasul)
Methyl bromide
p-chlorophenyl-phenylsulphone
p-chlorobenzyl-p-chlorophenylsulphide (Chlorbenside)
4-chlorophenyl-2,4,5-trichlorophenylazosulphide
2(p-tert.-butylphenoxy-1-methylethyl-2-chlorethylsulphite
2(p-tert.-butylphenoxy)cyclohexyl-2-propinyl-sulphite
4,4'-dichloro-N-methylbenzenesulphonanilide
N-(2-fluoro-1,1,2,2-tetrachlorethylthio)-methanesulphonanilide
2-thio-1,3-dithiolo-(4,5,6)quinoxaline (Thioquinox)
Chloromethyl-p-chlorophenylsulphone lauseto (sic! new)
1,3,6,8-tetranitrocarbazole and
Prop-2-inyl-(4-t-butylphenoxy)-cyclohexylsulphite (Propargil).

The action of the carbamates according to the invention can be increased yet further by synergistic agents. Suitable substances for this purpose are for example Sesamin, Sesamex, piperonyl-cyclonene, piperonyl-butoxide, piperonal bis(2-(2-butoxyethoxy)ethyl)acetate, sulphoxides, propyl isome (sic), N-(2-ethylhexyl)-5-norbornene-2,3-dicarboxamide, octachlorodipropyl-ether, 2-nitrophenyl-propargyl-ether, 4-chloro-2-nitrophenyl-propargyl-ether and 2,4,5-trichlorophenyl-propargyl-ether.

Pesticides which contain compounds of Formula I as active substances, can be used in the most diverse way and in various forms, for example in the form of solutions, sprays, dusting powders, scattering agents, granules, spraying powders, emulsions, dispersions and suspensions, and also so-called fly dishes or fly strips which are impregnated with a solution of the active substances.

To manufacture directly sprayable solutions of the compounds of Formula I, it is for example possible to use mineral oil fractions of high to medium boiling range, such as diesel oil or kerosene, coal tar oil and oils of vegetable or animal origin, as well as hydrocarbons, such as alkylated naphthalenes and tetrahydronaphthalene, optionally with the use of xylene mixtures, cyclohexanols, ketones and also chlorinated hydrocarbons, such as trichloroethane, trichloroethylene or trichlorobenzenes and tetrachlorobenzenes. Organic solvents of boiling point above 100° C. are advantageously used.

Aqueous application forms are particularly appropriately prepared from emulsion concentrates, pastes or wettable spraying powders, by adding water. Possible dispersing agents are non-ionic products, for example condensation products of aliphatic alcohols, amines or carboxylic acids having a long-chain hydrocarbon radical of about 10 to 20 carbon atoms with ethylene oxide, such as the condensation products of octadecyl alcohol and 25 to 30 mols of ethylene oxide or that of technical oleylamine and 15 mols of ethylene oxide or that of dodecylmercaptan and 12 mols of ethylene oxide. Amongst the anionic emulsifiers which can be employed, there may be mentioned: the sodium salt of dodecyl alcohol sulphuric acid ester, the sodium salt of dodecylbenzenesulphonic acid, the potassium salt or triethanolamine salt of oleic acid or of abietic acid or of mixtures of these acids, or the sodium salt of a petroleumsulphonic acid. Possible cationic dispersing agents are quaternary ammonium compounds, such as cetylpyridinium bromide or dihydroxyethylbenzyldodecylammonium chloride.

To manufacture dusting and scattering agents, it is possible to employ talc, kaolin, bentonite, calcium carbonate and calcium phosphate, but also charcoal, cork powder, woodflour and other materials of vegetable origin as solid carriers. The use of the preparations in a granular form is also very appropriate, for example for combating soil insects, soil fungi or pests in rice cultures.

Granules can be manufactured very simply by dissolving an active substance of Formula I in an organic solvent, applying the solution thus obtained to a granular mineral, for example attapulgite, $SiO_2$, granicalcium, bentonite and the like, and then again evaporating the organic solvent.

It is also possible to use polymer granules. They can be manufactured by mixing the active substances of Formula I with polymerisable compounds (urea/formaldehyde, dicyandiamide/formaldehyde, melamine/formaldehyde or others), after which a polymerisation is carried out under mild conditions, which leaves the active substances unaffected, and granulation is carried out whilst the gel formation is still proceeding. It is more advantageous to impregnate finished, porous polymer granules (urea/formaldehyde, polyacrylnitrile, polyesters and others) having a particular surface area and a favorable predeterminable adsorption/desorption ratio, with the active substances, for example in the form of their solutions (in a low-boiling solvent) and to remove the solvent. Such polymer granules, in the form of microgranules with bulk densities of preferably 300 g./litre to 600 g./litre, can also be applied with the aid of atomizers. Atomizing over extended areas of crop plant cultures can be carried out with the aid of aircraft.

Granules are also obtainable by compacting the carrier with the active substances and additives, and subsequent comminution.

The various application forms can, in the usual manner, be provided with the addition of substances which improve the distribution, the adhesion, the rain resistance or the penetrating capacity; as such substances there may be mentioned: fatty acids, resins, glues, caseins or alginates. When processing the active substances of Formula I to give ready-to-apply agents, an important factor in the choice of the auxiliary substances will be whether the carbamates are employed in the free form or in the form of a salt.

As a rule, the agents according to the invention contain 0.005 to about 95% of an active substance of Formula I. In individual cases, technically pure active substance can also be employed for combating pests, using application equipment which provides extremely fine distribution. The present invention also provides a process for the manufacture of the carbamates of the Formula I, wherein the carbamate of the formula

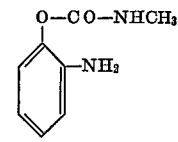

(IV)

is N-monoalkylated with a reactive ester of an alcohol of the formula R—OH, R having the meaning specified above.

As reactive esters of the alcohol ROH, the hydrogen halide acid esters, for example, the chlorides, bromides or iodides are advantageously used; it is, however, also possible to use sulphonic acid esters, for example, the mesylates or tosylates, with equal success for the N-alkylation.

In a similar manner, it is also possible to N-monoalkylate a carbonate of the formula

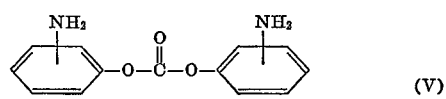

(V)

and subsequently to convert the product into carbamates of Formula I by means of methylamine.

The compounds of the Formula I can also be manufactured from the compounds of the Formulae IV or V, or the nitro compounds on which they are based, by reductive monoalkylation with lower aliphatic carbonyl compounds (for example, propionaldehyde, butyraldehyde, acetone or methyl ethyl ketone), splitting with methylamine again being necessary in the case of carbonates of the Formula V. Depending on the specific properties of the compounds, it may be advantageous to isolate the aldimines or ketimines which occur as intermediates. Catalytically activated hydrogen is preferably used as the reducing agent.

The carbamates thus obtained can, if desired, be converted into their acid addition salts with inorganic or organic acids. Depending on the solubility of the salts produced, the salt formation can be carried out in a solvent free of hydroxyl groups or in a solvent containing hydroxyl groups, such as methanol, ethanol, isopropanol, acetone or methyl ethyl ketone. Hydrohalic acids, such as hydrochloric acid, HBr or HI are, for example, suitable for the salt formation, as are phosphoric acid, sulphuric acid, nitric acid, perchloric acid, iodic acid, sulphamic acid, oxalic acid, maleic acid, citric acid, tartaric acid, succinnic acid, glycollic acid, ethionic acid, phthalic acid, methanesulphonic acid, benzenesulphonic acid, p-toluenesulphonic acid and trichloroacetic acid.

In general, the stability of the carbamate is increased by salt formation. Acid salts, for example, the acid sulphate of 2-isopropylamine-phenyl-N-methylcarbamate, are distinguished by particular stability.

The following examples illustrate the invention, the parts being by weight.

EXAMPLE 1

2-isopropylamino-phenyl-N-methylcarbamate
(Compound No. 1)

A mixture of 830 parts of 2-aminophenyl-N-methylcarbamate, 1300 parts of isopropyl bromide, 800 parts by volume of dioxane and 100 parts by volume of dimethylformamide is stirred for 2 days at 60–65° C. and subsequently evaporated in a waterpump vacuum. The residue is treated with 2000 parts by volume of ether and an equal quantity of saturated sodium bicarbonate solution. The ether phase is separated off, washed with water, dried over anhydrous sodium sulphate and evaporated. The residue mainly consists of 2-isopropylamino-phenyl-N-methylcarbamate. Chromatography on silica gel (elution with toluene) yields the pure product. Melting point 70–72° C.

The starting product, 2-aminophenyl-N-methylcarbamate, can be manufactured as follows:

A solution of 196 parts of 2-nitrophenyl-N-methylcarbamate in 700 parts by volume of glacial acetic acid is shaken in a hydrogen atmosphere, in the presence of 2.4 parts of 10 percent strength palladium on charcoal. When hydrogen absorption has ceased, the catalyst is filtered off and the filtrate is evaporated in vacuo. The residue is triturated with water, filtered, dried and crystallized from chloroform. Melting point 126–128° C.

EXAMPLE 2

2-propargylaminophenyl-N-methylcarbamate (Compound No. 2)

70 parts of 2-aminophenyl-N-methylcarbamate are dissolved in 100 parts by volume of approx. 10 percent strength aqueous hydrochloric acid. 55 parts of propargyl bromide are added dropwise to this solution, whilst stirring in a nitrogen atmosphere. The pH value of the solution is kept at 4–5 by simultaneously adding 30 percent strength sodium hydroxide solution. After completion of the reaction, the mixture is rendered alkaline and extracted with toluene. The toluene solution is dried, filtered and evaporated in vacuo. The residue is crystallized from toluene. Melting point 102–104° C.

EXAMPLE 3

2-(1',1'-dimethyl-2'-propinyl-amino)-phenyl-N-methylcarbamate (Compound No. 3)

83 parts of 2-aminophenyl-N-methylcarbamate are suspended in 300 parts of water in a nitrogen atmosphere. Thereafter 5 parts of copper-I chloride and, as are 62 parts of 3-chloro-3-methyl-1-butine are added—the latter dropwise—whilst stirring. The mixture is kept at pH 4–5 by continuous addition of 5 percent strength sodium hydroxide solution and at approx. 20° C. by cooling. After completion of addition of the 3-chloro-3-methyl-1-butine the mixture is stirred for a further ½ hour at 20° C., subsequently treated with 300 parts by volume of ether, brought to pH=7 with sodium bicarbonate solution and filtered through Celite. The organic phase is separated off, washed with water, dried over anhydrous sodium sulphate and evaporated. The residue is crystallized from cyclohexane. Melting point 89–92° C.

EXAMPLE 4

2-(1',1'-dimethyl-allyl-amino)phenyl-N-methylcarbamate (Compound No. 4)

A solution of 70 parts of 2-(1',1'-dimethyl-2'-propinyl-amino)phenyl-N-methylcarbamate in 200 parts by volume of pyridine is mixed with 3.5 parts of a 10 percent strength palladium catalyst (on calcium carbonate) and shaken in a hydrogen atmosphere until the theoretical amount of hydrogen has been taken up. The catalyst is filtered off and the solution is evaporated in vacuo. The residue is dissolved in ether, washed with dilute sodium hydroxide solution under ice-cold conditions, and chromatographed on silica gel. The product is crystallized from hexane. Melting point 66° C.

By hydrogenation with palladium on charcoal in dioxane, 2-(1,1-dimethyl-propyl-amino)-phenyl-N-methylcarbamate is obtained from the above product. Melting point 57–62° C. (Compound No. 5).

EXAMPLE 5

2-(1'-methoxy-2'-propyl-amino)phenyl-N-methylcarbamate (Compound No. 6)

135 parts of 1-methoxy-2-propyl-tosylate are added dropwise at 50° C. to a mixture of 83 parts of 2-aminophenyl-N-methylcarbamate, 15 parts of potassium iodide and 48 parts of dry pyridine. The mixture is kept for a further 14 hours at 60° C. and is then cooled and poured onto 1000 parts of ice water. The oily product is obtained by extraction with ether and evaporation of the solvent, and is purified by chromatography on silica gel (elution with toluene).

NMR spectrum: δ-values (CDCl₃/TMS). 1.22, d (J=6 cps.), 3H,

2.82, d (J=5 cps.), 3H (—CO—NH—CH₃); approx. 3.4, s+d, 5H, (—CH—CH₂—O—CH₃); approx. 3.6, m, 1H, (—CH—CH₂—OCH₃); approx. 4.0, b, 1H,

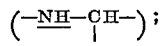

approx. 5.3, b, 1H, (—CO—NHCH₃); 6.5–7.3, m, 4H (aromat. H).

The following can be manufactured in a similar manner:

(7) 2-(n-propylamino)phenyl-N-methylcarbamate, melting point 54° C.,
(8) 2-(n-butylamino)phenyl-N-methylcarbamate, melting point 72° C.,
(9) 2-(sec.-butylamino)phenyl-N-methylcarbamate, oil
(10) 2 - allylaminophenyl-N-methylcarbamate, melting point 75–77° C.
(11) 2-(1-methyl-allylamino)phenyl-N-methylcarbamate, oil and
(12) 2 - (3-butin-2-ylamino)phenyl-N-methylcarbamate, melting point 119–121° C.

EXAMPLE 6

(a) Dusting agents

Equal parts of an active substance according to the invention and of precipitated silica are finely ground. Dusting agents preferably containing 1–6% of active substance can be manufactured therefrom by mixing with kaolin or talc.

(b) Spraying powders

To manufacture a spraying powder the following components, for example, are mixed and finely ground:

50 parts of active substance according to the present invention,
20 parts of highly adsorbent silica,
25 parts of *Bolus alba* (kaolin),
1.5 parts of sodium 1-benzyl-2-stearyl-benzimidazole-6, 3'-disulphonate and
3.5 parts of a reaction product of p-tert.octylphenol and ethylene oxide.

(c) Emulsion concentrate

Easily soluble active substances can also be formulated as an emulsion concentrate in accordance with the following instruction:

20 parts of active substance
70 parts of xylene and
10 parts of a mixture of a reaction product of an alkyl phenol with ethylene oxide and calcium dodecylbenzenesulphonate are mixed. On dilution with water to the desired concentration, a sprayable emulsion is produced.

(d) Granules 7.5 g. of one of the active substances of Formula I are dissolved in 100 ml. of acetone and the acetone solution thus obtained is added to 92 g. of granular attapulgite (mesh size: 24/48 meshes/inch). The whole is well mixed and the solvent is stripped off in a rotary evaporator. Granules containing 7.5% of active substance are obtained.

EXAMPLE 7

5 parts of an active substance according to the invention and 5 parts of talc are mixed and finely ground. On mixing in a further 90 parts of talc, a 5% strength dusting powder is obtained as the starting mixture for an active substance dilution series for testing against storage pests on filter paper in glass dishes. 2 g. of this mixture per glass dish correspond to 100 mg. of active substance/m.$^2$.

Further 1:1 dilutions of the 5% strength dusting powder yield 2.5% strength, 1.25% strength, 0.62% strength, 0.31% strength, 0.16% strength and 0.08% strength mixtures which correspond to an amount of active substance of 50, 25, 12.5, 6.2, 3.1 and 1.5 mg. of active substance/m.$^2$, if 2 g. of the particular dust formulation are used per glass dish.

Evaluation after 24 hours showed that the following minimum concentrations were necessary, for complete destruction of the particular pests:

| Compound number | 1 | 2 | 10 | 12 |
|---|---|---|---|---|
| German cockroach (Phyllodromia germanica) | 6 | 12 | 100 | 12 |
| American cockroach (Periplaneta americana) | 3 | 12 | 6 | 6 |
| Russian cockroach (Blatta orientalis) | 6 | 12 | 12 | 100 |
| Leather beetle (imago) Dermestes frischii | 50 | 100 | 50 | 200 |
| Leather beetle (larva) | 25 | 25 | 12 | 50 |
| House cricket (Aehcta domestica) | 12 | 12 | 25 | 50 |

EXAMPLE 8

Action against *Aphis fabae*

Young *Vicia faba* plants about 6 cm. high were infested with parts of plants attacked by *Aphis fabae*. After 5 days, the starting conditions for the active substance test existed as a result of further growth of the plants and correspondingly great increase in the aphids. The attacked plant was sprayed with an emulsion of the active substance to be tested from all sides (contact action) or only from above, in the direction of the axis of the shoot (penetration action). In the latter case, the test insects on the undersides of the leaves are not struck by the spray jet. If 100% mortaliity was already found after 2 days, the plant was re-infested.

In comparison with the compound

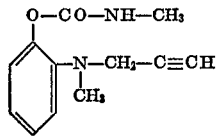

(Compound A)

known from Belgian patent specification 719,776 and compound

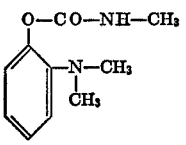

(Compound B)

known from Belgian patent specification 606,296, the following mortalities expressed as a percentage, were achieved with the compounds according to the present invention:

| Compound number | Concentration (p.p.m.) | Contact action 2 days | Contact action 5 days | Penetration 2 days |
|---|---|---|---|---|
| 1 | 800 | 100 | 100 | 100 |
|   | 400 | 100 | 80 | 100 |
|   | 200 | 100 | 60 | 100 |
|   | 100 | 100 | 0 | 100 |
| 2 | 800 | 100 | 80 | 100 |
|   | 400 | 100 | 80 | 100 |
|   | 200 | 100 | 60 | 100 |
|   | 100 | 100 | 60 | 80 |
| 3 | 800 | 100 | 100 | 100 |
|   | 400 | 100 | 80 | 100 |
|   | 200 | 100 | 80 | 100 |
|   | 100 | 100 | 60 | 100 |
|   | 50 | 100 | 60 | 80 |
|   | 25 | 100 | 60 | 80 |
| 6 | 800 | 100 | 80 | 100 |
|   | 400 | 100 | 60 | 100 |
|   | 200 | 100 | 60 | 100 |
|   | 100 | 100 | 0 | 100 |
| 7 | 800 | 100 | 100 | 100 |
|   | 400 | 100 | 80 | 100 |
|   | 200 | 100 | 60 | 100 |
|   | 100 | 100 | 0 | 100 |
| 10 | 800 | 100 | 100 | 100 |
|   | 400 | 100 | 80 | 100 |
|   | 200 | 100 | 80 | 80 |
|   | 100 | 100 | 0 | 60 |
| 12 | 800 | 100 | 100 | 100 |
|   | 400 | 100 | 80 | 100 |
|   | 200 | 100 | 0 | 80 |
|   | 100 | 100 | 0 | 80 |
| A | 800 | 100 | 80 | 80 |
|   | 400 | 100 | 100 | 0 |
|   | 200 | 100 | 80 | 0 |
|   | 100 | 100 | 60 | 0 |
| B | 800 | 100 | 0 | 80 |
|   | 400 | 80 | 0 | 0 |
|   | 200 | 0 | 0 | 0 |
|   | 100 | 0 | 0 | 0 |

The compounds according to the present invention additionally, and in contrast to the comparison Compounds A and B, possess a systemic action, that is to say they are absorbed by the plant and transported with the sap flow.

EXAMPLE 9

Contact action on *Ceratitis capitata*

1 half of a Petri dish was in each case treated with 1 ml. of an acetone solution containing 1000, 100, 10, 5, 2.5 and 1.25 p.p.m. of the active substance to be tested. After evaporation of the solvent, 10 sub-cooled Mediterranean fruit flies were introduced into the prepared Petri dishes and the lid halves were placed in position. After increasing time intervals, the destruction was examined at the various concentrations. The following percentage mortality was achieved after 2 hours:

| Concentration (p.p.m.) | Compound number | | | | | |
|---|---|---|---|---|---|---|
|   | 1 | 3 | 6 | 9 | 10 | 12 |
| 1,000 | 100 | 100 | 100 | 100 | 100 | 100 |
| 100 | 100 | 100 | 100 | 100 | 100 | 100 |
| 10 | 100 | 100 | 100 | 100 | 100 | 100 |
| 5 | 100 | 100 | 100 | 100 | 100 | 100 |
| 2.5 | 100 | 100 | 100 | 100 | 50 | 100 |
| 1.25 | 100 | 100 | 30 | 100 | 0 | 100 |

EXAMPLE 10

(a) The test with *Epilachna varivestis*, the Mexican bean beattle, was carried out as follows: 4–5 seedlings of *Phaseolus vulgaris* in the primary leaf stage, grown in a flower-pot, were dipped in emulsions of the test preparations and subsequently allowed to dry. The test insects L–4 stages of the beetle, were introduced into a cellophane bag which was subsequently fixed over the treated plant by means of a rubber band. After 5 days the effect of the treatment was determined by counting the live and dead animals and by calculating the percentage mortality.

| Concentration (p.p.m.) | Compound number | | | | | |
|---|---|---|---|---|---|---|
| | 1 | 2 | 6 | 7 | 10 | 12 |
| 800 | 100 | 100 | 100 | 100 | 100 | 100 |
| 400 | 100 | 100 | 100 | 100 | 100 | 100 |
| 200 | 80 | 100 | 100 | 80 | 60 | 60 |
| 100 | 80 | 80 | 100 | 0 | 60 | 0 |

(b) The test was *Orgyia gonostigma* in the L-3 stage was carried out analogously, with young mallows (*Malva silvestris*) as the host plant. 5 larvae were used for each test. Evaluation took place after 2 and 5 days. If complete mortality had already occurred after 2 days, the plant was re-infested. In this way, a possible ageing of the active substance coating is also taken into account in the evaluation.

| Compound number | Concentration (p.p.m.) | After 2 days | After 5 days |
|---|---|---|---|
| 1 | 800 | 100 | 0 |
| | 400 | 80 | 100 |
| | 200 | 60 | 80 |
| | 100 | 60 | 80 |
| 2 | 800 | 100 | 100 |
| | 400 | 80 | 100 |
| | 200 | 60 | 80 |
| | 100 | 60 | 80 |
| 6 | 800 | 80 | 100 |
| | 400 | 80 | 100 |
| | 200 | 60 | 100 |
| | 100 | 60 | 100 |
| 10 | 800 | 100 | 0 |
| | 400 | 80 | 100 |
| | 200 | 60 | 60 |
| | 100 | 60 | 60 |
| 12 | 800 | 80 | 100 |
| | 400 | 60 | 100 |
| | 200 | 60 | 60 |
| | 100 | 0 | 0 |

EXAMPLE 11

Action against assassin bugs (*Rhodnius prolixus*). Solutions of the active substance, in acetone, are applied in Petri dishes of 11 cm. diameter in such a way that concentrations of 1 mg., 0.1 mg., 0.01 mg. and 0.001 mg. per dish are provided. (1 mg. per dish corresponds to 1 g. per 9.4 m.$^2$.) After one hour's drying of the prepared dishes, 20 bugs in the L-3 stage are exposed to the active substance coating for 24 hours. The action is tested after 24 hours.

A single repeat was run with a new dilution series. Total mortalities were achieved with the following minimum concentrations of the particular active substances:

| Compound No.: | Minimum concentration (mg./dish) |
|---|---|
| 1 | 0.001 |
| 3 | 0.001 |
| 6 | 0.001 |
| 7 | 0.01 |
| 9 | 0.01 |
| 10 | 0.001 |
| 11 | 0.001 |

What is claimed is:

1. A carbamate of the formula

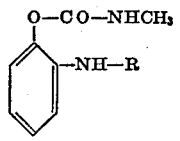

in which R represents an alkyl, alkoxyalkyl, alkenyl or alkynyl radical having from 3 to 5 carbon atoms, or an acid addition salt.

2. A carbamate according to claim 1, in which R represents a branched alkyl, alkoxyalkyl, alkenyl or alkynyl radical having from 3 to 5 carbon atoms, or an acid addition salt.

3. The carbamate of the formula

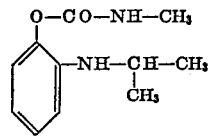

or an acid addition salt according to claim 2.

4. The carbamate of the formula

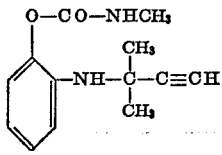

or an acid addition salt according to claim 2.

References Cited

UNITED STATES PATENTS 3,522,292  7/1970  Nikles _____ 260—479
3,160,554  12/1964  Heiss et al. _____ 260—479

OTHER REFERENCES

Warner et al.: Synthetic Organic Chem., Wiley and Sons, New York (1955), p. 667.

JAMES A. PATTEN, Primary Examiner

U.S. Cl. X.R.

260—463, 999; 424—300